(12) United States Patent
Milligan

(10) Patent No.: US 7,685,377 B1
(45) Date of Patent: Mar. 23, 2010

(54) PIECEWISE LOGICAL DATA MANAGEMENT

(75) Inventor: Charles A. Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 272 days.

(21) Appl. No.: 11/485,148

(22) Filed: Jul. 12, 2006

(51) Int. Cl.
*G06F 13/00* (2006.01)
(52) U.S. Cl. ..................... 711/154; 711/216
(58) Field of Classification Search ............... 711/154, 711/216
See application file for complete search history.

(56) References Cited

U.S. PATENT DOCUMENTS

| | | | |
|---|---|---|---|
| 5,155,835 A | 10/1992 | Belsan | |
| 5,155,845 A | 10/1992 | Beal et al. | |
| 5,193,184 A | 3/1993 | Belsan et al. | |
| 5,210,866 A | 5/1993 | Milligan et al. | |
| 5,239,659 A | 8/1993 | Rudeseal et al. | |
| 5,247,638 A | 9/1993 | O'Brien et al. | |
| 5,293,556 A | 3/1994 | Hill et al. | |
| 5,325,505 A | 6/1994 | Hoffecker et al. | |
| 5,379,391 A | 1/1995 | Belsan et al. | |
| 5,388,060 A | 2/1995 | Adams, Jr. et al. | |
| 5,717,884 A * | 2/1998 | Gzym et al. ............... | 711/206 |
| 6,195,730 B1 | 2/2001 | West | |
| 6,311,251 B1 | 10/2001 | Merritt et al. | |
| 6,314,338 B1 | 11/2001 | Billington | |
| 6,330,621 B1 | 12/2001 | Bakke et al. | |
| 6,624,762 B1 * | 9/2003 | End, III ............... | 341/51 |
| 6,640,294 B2 | 10/2003 | Debiez et al. | |
| 6,742,082 B1 * | 5/2004 | Lango et al. ............... | 711/118 |
| 6,839,819 B2 | 1/2005 | Martin | |
| 6,898,688 B2 | 5/2005 | Martin et al. | |
| 6,912,629 B1 | 6/2005 | West et al. | |
| 6,925,528 B2 | 8/2005 | Selkirk et al. | |
| 7,002,961 B1 | 2/2006 | Lane et al. | |
| 7,007,043 B2 | 2/2006 | Farmer et al. | |
| 7,007,044 B1 | 2/2006 | Rafert et al. | |
| 7,036,043 B2 | 4/2006 | Martin et al. | |
| 7,170,997 B2 * | 1/2007 | Petersen et al. ............ | 380/268 |
| 2003/0149670 A1 * | 8/2003 | Cronce ............ | 705/59 |
| 2004/0003255 A1 | 1/2004 | Apvrille et al. | |
| 2005/0226419 A1 * | 10/2005 | Smathers et al. ............ | 380/259 |

OTHER PUBLICATIONS

Microsoft Press Computer Dictionary, 3$^{rd}$ Edition by Microsoft Press, 1997, p. 145.*

* cited by examiner

*Primary Examiner*—Reba I Elmore
(74) *Attorney, Agent, or Firm*—Brooks Kushman P.C.

(57) ABSTRACT

A method for storing data that is reconstructable in a piecewise manner comprises receiving a user data unit in the form of a data stream to be stored in the data storage system. A plurality of logical data units associated with the user data unit are then identified. A digital signature is associated with each logical data unit and stored within a component of the data storage system. The logical data unit digital signature is used by the data storage system to determine whether or not to actually store each logical data unit. A digital signature for the entire user data unit is also determined and associated with the user data unit. A reconstructed user data unit when desired is then assembled by examining the stored logical data unit digital signatures.

18 Claims, 7 Drawing Sheets

PIECEWISE LOGICAL DATA MANAGEMENT

BACKGROUND OF THE INVENTION

1. Field of the Invention

The present invention relates to methods of managing, validating, retrieving, and reconstructing digital data in a piecewise manner.

2. Background Art

Digital data storage management includes provisions for managing user data units originally received from a using system, validating that user data unit whenever it is retrieved, and maintaining a required level of data reliability. Such storage management is currently addressed via a number of mechanisms. Such mechanisms include providing metadata useful for identifying the location of the original user data unit, verifying correctness of the original data as it is retrieved, and providing additional data (i.e., redundant data) that can be used to recover (i.e., correct or recreate) any parts of the original data found to be missing or incorrect (either by outright loss or by being damaged in some way). The metadata is generally managed separate from the data but the data and the redundant data are most often managed via some version of Redundant Array of Independent/Inexpensive Disks ("RAID") structures. Such RAID structures include RAID1 (mirroring), RAID3 or RAID5 (parity), or multiple redundancy placed into one of these RAID structures such as Reed Solomon. In each case, the intent is to add metadata and some additional data (thus the term redundancy) to the storage system and manage the additional data in such a way that loss or damage to any part of the original user data is extremely unlikely to also result in a loss or damage to the redundant data. Therefore, the redundant data is available to recover original user data in order to reconstruct data that has been lost or damaged. The primary problem with these methodologies is a cost and performance tradeoff that users must accept. The tradeoff is measured in terms of both the granularity of the recovery options and in the cost of the processes involved in the recovery of data. The granularity of recovery relates to the notion that data is received and managed in some blocked format. One example is to note that a user data unit is a set of data known at the user level outside the storage subsystem (e.g., a dataset or a data file) and communicated to the storage subsystem by an agreed upon name. The user data unit has boundaries that are managed in the using system rather than the storage system. However, such a user data unit is received from the using system one small piece (e.g., one record or one 512 byte segment) at a time. The usual redundancy process is to create the metadata and the redundancy data for the overall envelope of the user data unit received and associate it with the agreed upon name. Therefore, it is necessary not only to have significant redundant data (e.g., in the case of mirroring which is explained in more detail below, redundancy includes whole copies of files), but also to manage retrieval on the basis of utilizing these redundant data in a whole data unit context, because the metadata is also managed in that context.

Mirroring is the simplest process to provide redundant data, and requires the simplest metadata since it is simply the location of an additional copy (copies) of the data. Mirroring provides the highest performance option when redundant data is placed in the same level of the storage hierarchy as the initial data but is the most expensive in terms of capacity used and network traffic to accomplish the writing since the data must be sent to two different locations for storage. When the mirror data is placed in a lower level of the storage hierarchy (e.g., backup data placed on tape) the cost is reduced but the access time is increased. The other RAID options are less expensive than mirroring with respect to capacity utilization and network traffic for writing data until a recovery operation is required during data retrieval. At the time of retrieval, if reconstruction is required and mirroring has been used, the retrieval is simply redirected to the alternative copy of the data. However, with the data parity or multiple redundancy options of RAID3 or RAID5, a large amount of data must be accessed and provided to a reconstruction process. This results in a response time to access the data that is slower than for mirroring.

One mechanism for determining whether a given unit of data is damaged and needs to be reconstructed is by evaluation of digital signatures and/or hashes that are metadata created and associated with data as it is being stored. The failure of a given set of data to exhibit the correct digital signature when compared to the digital signature or hash generated at storage time provides an indication the data must be regenerated from redundant data. Again, such reconstruction typically requires that a large amount of data be accessed.

Accordingly, there exists a need in the prior art for improved methods of managing and reconstructing data.

SUMMARY OF THE INVENTION

The present invention solves one or more problems of the prior art by providing in one embodiment a method of managing data in a piecewise manner relating to the process of the storage system's original receipt of data. This management includes piecewise validation of the original data as it is retrieved and when necessary, piecewise reconstructing data stored in a digital data storage system. The method of this embodiment uses a set of metadata to uniquely identify individual instances of primary data throughout the system at more than one level of granularity (including all the instances of system duplications like mandatory backup processes). The method of this embodiment comprises receiving a user data unit in the form of one or more data streams to be stored in the data storage system. Examples of user data units include a data file, a data set, a data base, a data object, etc. The user data unit is provided by one or more using systems and received by the data storage system. A plurality of logical data units associated with the user data unit can then be identified. Logical data units may be subsets of the related user data unit such as the individual records in a file or the blocks of data in fixed-block architectures. The subset can be some portion of the user data unit or can be the whole of the user data unit. The subsets can be unique in that they do not overlap or they could overlap. For example, the logical data units could be overlapping subsets such as the first record in a file, the first and second record, the first three records, etc. up to the whole file. One can see that there are many ways to make logical structures that will be helpful in managing the user data unit throughout the life cycle in the storage system. For the purposes of this description, the simplistic case of the logical data units being non-overlapping was used. However, it is clear that overlapping logical data units can also be used in this solution. An identifying metadata intended to be globally unique such as a hash or a digital signature is associated with each logical data unit and additionally may also be created and associated with groups of logical data units. The logical data unit digital signature is used by the data storage system to determine whether or not to actually store each logical data unit. It is an option to choose not to store the logical data unit at all if, for example, there is already another stored logical data unit with the identical digital signature. A digital signature for the entire user data unit is also determined and associated with the user data unit. The method of this embodiment identifies redundancy opportunities that exist within stored data. Advantageously, the method of this embodiment creates metadata that identifies data objects by parts (e.g., via digital signatures or other hashes on blocks) retaining a full inventory of parts and associated digital signatures. Reconstruction of broken objects is accomplished from parts that may be stored in completely independent objects as redundant copies of the original.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The terms "user data or user data unit' as used herein means any set of data presented by a user or using system to a storage system for storage.

The term "using system" as used herein means any person, system, devise, computer based system, or process presenting data to a storage system for storage.

The term "primary storage location" as used herein means the location within the storage subsystem where the user data is stored for expectant retrieval by the using system.

The term "secondary storage location" as used herein means the location within the storage subsystem where a copy of the user data or redundant data is stored for expectant reaction to identified data loss or damage during retrieval of the primary data by the using system.

The term "digital signature" (and alternatively the term "hash") as used herein means an algorithm provided to process a unit of data and create a digital string of bits that with some probability approaching but always less than one, will uniquely identify the unit of data or validate the contents of that unit of data. These are stored within a component of the data storage system. The term "hash" or the "digital signature" includes any metadata that is intended to be unique in globally identifying the logical data unit or data unit set from other data units or sets (including user, virtual, logical, and physical organizations of data).

Figure 1A:
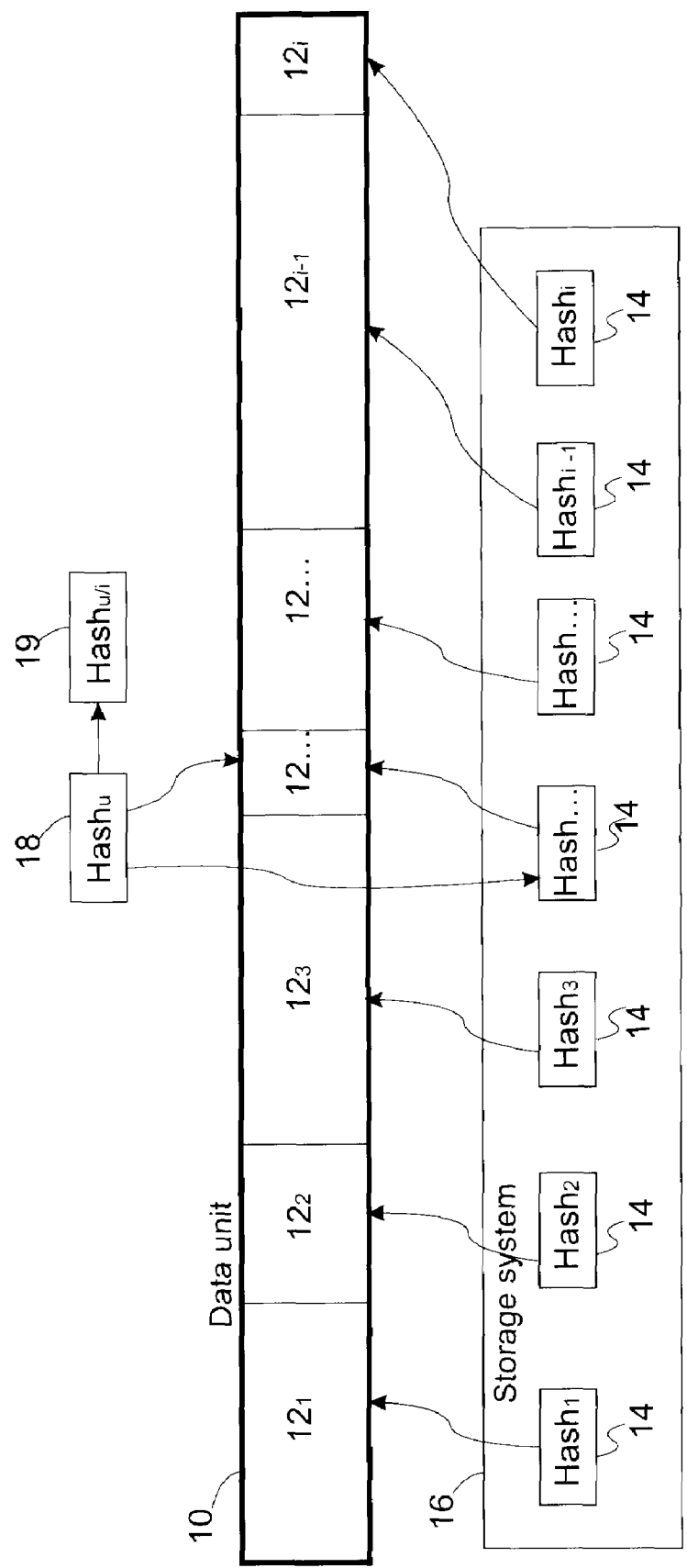
FIG. 1A is a schematic illustration of an embodiment of the invention of storing metadata and data for piecewise management, validation or reconstruction.
Figure 1B:
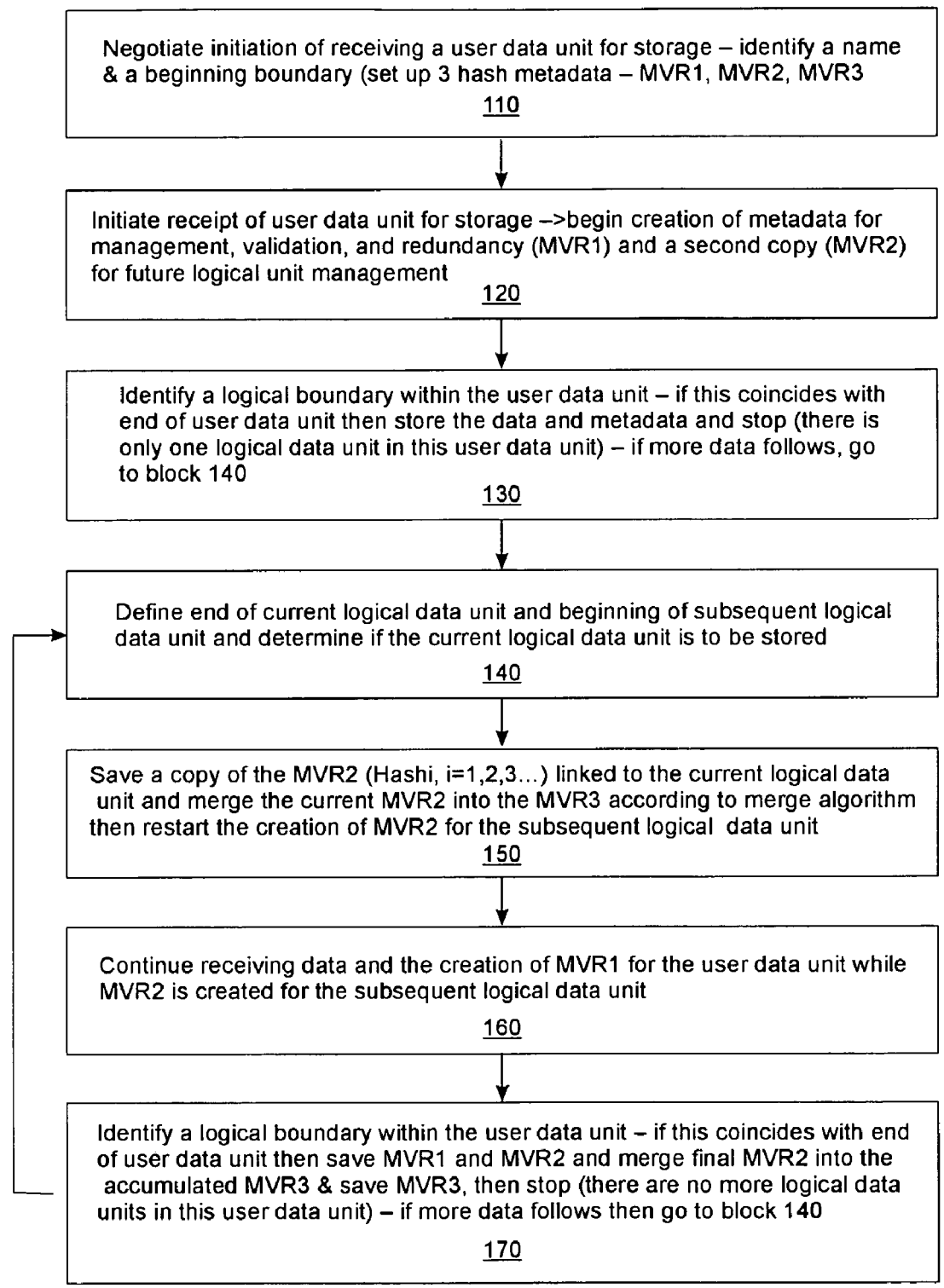
FIG. 1B is a flowchart of a method related to the schematic illustration of FIG. 1.

In an embodiment of the present invention, a method of storing metadata and data for piecewise management, validation, and reconstruction is provided. With reference to FIGS. 1A and 1B, the method of this embodiment is described. FIG. 1A provides a schematic illustration of the method while FIG. 1B provides a flowchart of this embodiment. The method of this embodiment comprises receiving user data unit 10 in the form of a data stream to be stored in the data storage system (Box 110). User data unit 10 is provided by a using system to the storage system for storage. User data unit 10 includes delineated data boundaries used to define and indicate the beginning and end of the user data unit as it is streaming into the data storage system. The using system communicates to the storage system that the user data unit has a beginning (Box 110) and an end which is used by the storage system as set forth below to create a digital signature over the user data unit. At least three hash metadata instances are created and referred to as MVR1, MVR2, and MVR3. For example, the boundaries are provided by the using system and are used by the storage system to identify the user data unit as a file (e.g. "foo") with an associated filename. As shown by Box 120, receipt of user data unit 10 for storage is initiated with metadata being created for management, validation, and redundancy (MVR1) and a second copy (MVR2) for future logical unit management.

The method of this embodiment further comprises identifying a plurality of logical data units $12_1$ to $12_i$, which are subsets of the user data unit as shown in Box 12. During operation of this step, the storage system receives the user data unit and notices that there are some convenient or naturally occurring breaks (e.g., logistics of commands or control information supplied by the using system, hesitations in transfer of data or other natural data boundaries such as buffer fill conditions or specific data size settings or limitations) in the way the user data unit is streaming in (Box 130). In this step, a logical boundary is identified within the user data unit. If this logical boundary coincides the end of user data unit 10 then the data and metadata is stored and the process stopped since there is only one logical data unit in this user data unit. If additional data is streaming in, then the method proceeds to the step of Box 140. It should be appreciated that the identified natural boundaries can provide a rationale for determining logical boundaries for logical data units $12l$ to $12i$. Moreover, these boundaries exist since a whole data unit is typically not received in one portion. It should be appreciated that the storage subsystem breaks up the streaming user data unit in any number of ways. For example, the user data units may be broken up on a record basis or by patterns in which the storage subsystem receives a few records followed by a period of time during which no records are received. In another variation, the user data units are broken up based on a buffer becoming filled to capacity. In yet another variation, the user data units are broken up in relation to pauses or hesitation occurring in the user processes. In yet another variation, the logical data unit is determined by the size of the data blocks transferred from the using system to the storage system. For example, 4K blocks may be received intermittently by the storage subsystem so that 4K blocks become a rational choice for the logical data unit. In another example, the logical data unit is the amount of data received over a given period of time. In addition, boundaries can be constructed by command or by a supplied algorithm. In each instance there is some rationale for the storage system recognizing that a logical boundary is reached, which rationale can be different for each logical data unit in a user data unit. Such a logical boundary being a subset of the delineated boundaries set forth above for the user data unit. Note, that when logical data units overlap, the end of one logical unit does not necessarily signal the beginning of another so provision would have to be made for multiple logical units to track simultaneously. Examples of logical data units include, but are not limited to, a data block, a record, a database row, a database column, a data object, a virtual or physical device sector or track, and combinations thereof. In a particularly useful variation, the user data unit is a file and the logical data unit is a record. Although each of the logical data units identified in this step are not necessarily the same size as each other. However, combining (e.g., concatenating for non-overlapping units) the plurality of logical data units together results in a reconstructed user data unit having the same size as the original user data unit. Moreover, with non-overlapping logical data units, each byte of the user data units is contained in only one of the logical data units. Finally, generally, the logical data units will be greater than a predetermined size as units of very small size will be ineffective for some data management processes (e.g., data reconstruction).

Still referring to FIGS. 1A and 1B, the method of the present embodiment processes with the end of current logical data unit and the beginning of subsequent logical data unit being defined with a determination being made if the current logical data unit is to be stored. (Box 140). In the next step, shown in Box 150, a copy of the MVR2 (Hash$_i$, i=1, 2, 3 . . . ) linked to the current logical data unit is saved. Additionally, the current MVR2 is merged into the MVR3 according to a merge algorithm. The creation of MVR2 is then restarted for the subsequent logical data unit. Further data is continued to be received with the continuing creation of MVR1 for the user data unit while MVR2 is created for the subsequent logical data unit.

The digital data storage system associates a hash or other form of digital signature with each identified logical data unit as indicated by Box 14. It is also an option that there are digital signatures for groups of logical data units and for overlap subsets of overlapping logical data units. These digital signatures in their various forms are referred to as logical data unit digital signatures. In a variation, these logical data unit digital signatures are determined by the method of hashing and digital signature creation of the prior art. Such prior art methods include running the logical data units through a digital signature creator. These digital signatures identify the quasi uniqueness of each of the logical data units that come in (e.g., each record).

Figure 1C:
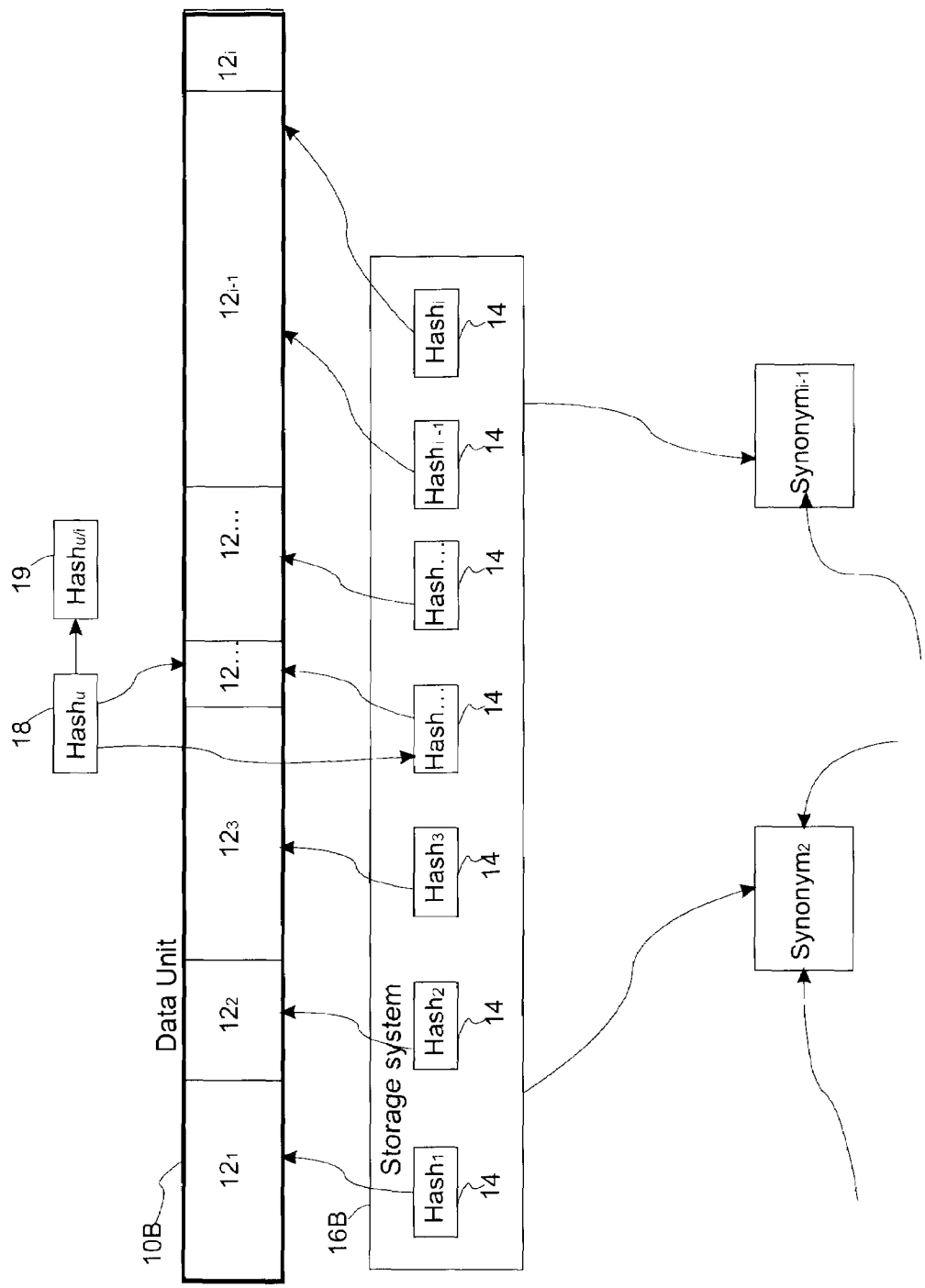
FIG. 1C is a schematic illustration of another embodiment of the invention of storing metadata and data for piecewise management, validation or reconstruction of an embodiment of the invention.

With reference to FIGS. 1A, 1B, and 1C, the process of storing data unit 10 is provided. The plurality of logical data unit digital signatures as stored on one or more storage devices contained within or communicating with the storage system (Box 16). The logical data unit digital signatures are advantageously used to determine whether or not to actually store each logical data unit at a primary storage location, at one or more secondary storage locations, or at a combination thereof. Specifically, for a given logical data unit, if the storage system identifies a previously stored data unit having the same digital signature as the logical storage unit, then one or both of the two options might be invoked. The first option is that the system can identify a synonym relationship existing between the sets of logical data units with identical digital signatures (see FIG. 1C). The second option is that the new logical data unit is not stored since its data is most probably already stored, and one of the existing stored data is identified as the data to be retrieved when required (the others being identified as synonyms for that stored data).

Finally, as indicated in Box 18, a user data unit digital signature is associated with the user data unit and with the set of logical data unit digital signatures created (Box 16) (see also storing of the final version of MVR1 in FIG. 1, Box 170). This user data unit digital signature is the digital signature across the entire user data unit. Moreover, the user data unit digital signature is stored on storage devices contained in or in communication with the storage system. In addition, another digital signature that (in real time or later) is algorithmically built from the set of logical data unit digital signatures is also associated with the user data unit (Box 19) called the logical user data unit digital signature (for example, with non-overlapping logical units this would be the final version of MVR3 in FIG. 1, Box 170). It could also be formed by a combination of the logical unit digital signatures (e.g., by concatenating them, creating an exclusive or of a subset, or by other logical combinations that would provide a set of metadata intended to be unique in globally identifying the user data unit. Either of these signatures can be used for validation that the data is correct when such is required by a using system or by an auditing system.

Figure 2:
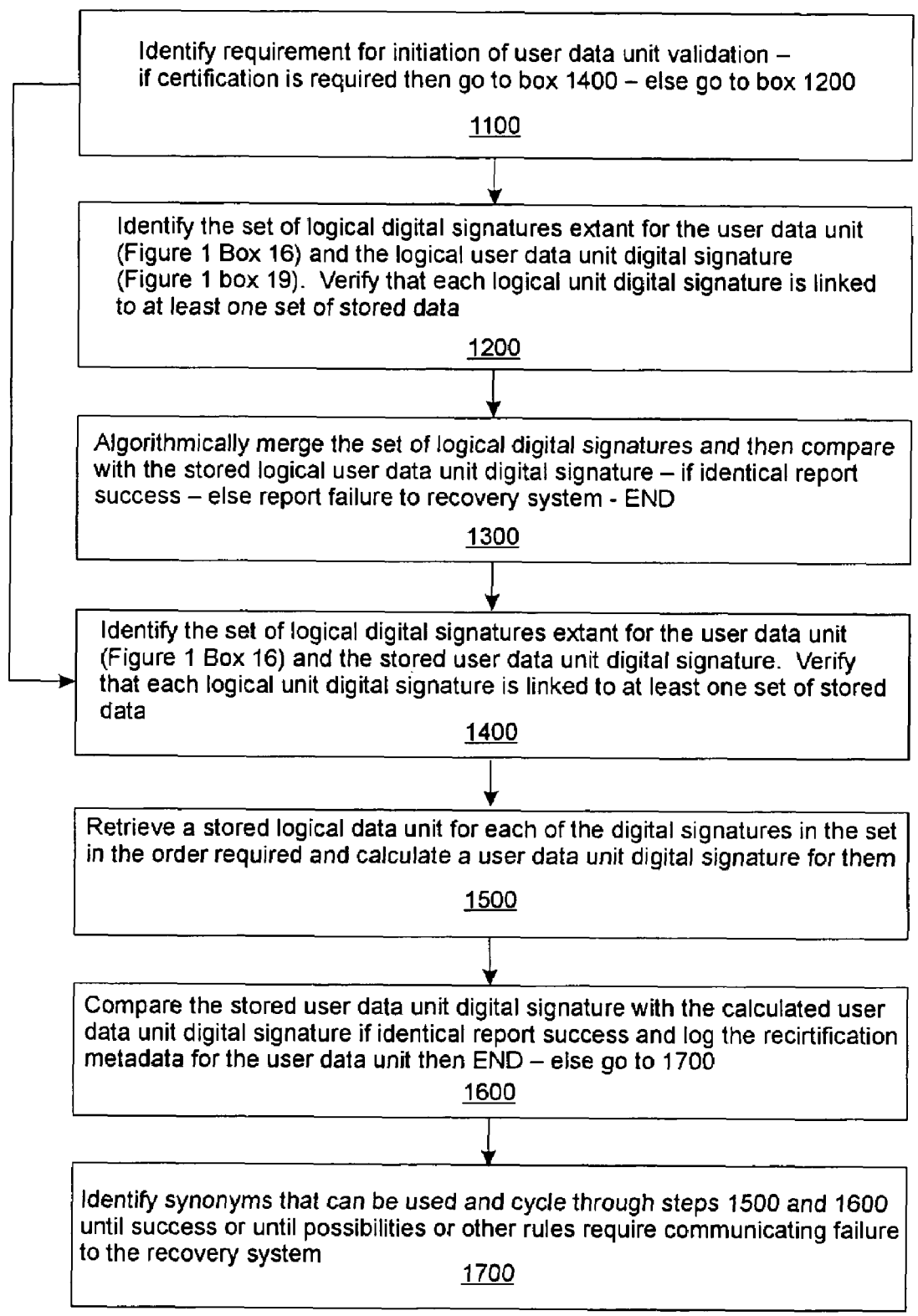
FIG. 2 is a flowchart illustrating a method of data validation used in association with the methods of storing data of the present invention.

In another embodiment of the present invention, a method of validating digital data utilizing data stored by the method set forth above is provided. Once the user data unit is stored, the data may be validated when desired. With reference to FIG. 2, a flowchart illustrating this data validation is provided. Note, the validation can proceed with a certification or without. Certification is a stronger version of validation than without. In response to a request for data validation, stored logical data units that are associated with the user data unit are identified by examining the logical data unit digital signature set 16 (Box 1100). Next, each logical digital signature is verified to identify at least one stored logical data unit, and then if certification is required, specific logical data units are selected to be retrieved and evaluated with respect to the user data unit (Box 1400). The logical data units selected may be from the original user data unit when stored or may be alternative logical data units determined to be identical and used as synonyms. These selected logical data units are then retrieved as indicated by Box 1500. A data unit digital signature across the data organized from the retrieved logical data units retrieved is calculated (Box 1500). This calculated digital signature is referred to as a composite retrieved logical data unit digital signature. Finally, the stored digital signature for the user data unit 18 is compared to the newly created composite retrieved logical data unit signature (Box 1600). If the signatures compare, the stored data is newly validated and the validation is dated and stored (i.e., certified) (Box 1700). If there is a discrepancy between the two signatures, the process continues using alternate logical data units until all have been exhausted or an exact compare is identified. Each instance of a discrepancy is noted and the synonym relationships are documented as not valid. If there is no exact comparison after exhausting all possible combinations, the data reconstruction process is invoked. If no certification is required, the validation effort is much simpler. Once each of the logical data unit digital signatures are verified to identify at least one stored logical data unit, the set of logical data unit digital signatures is merged according to the merging rules and then compared with the stored logical user data unit digital signature 14.

Figure 3A:
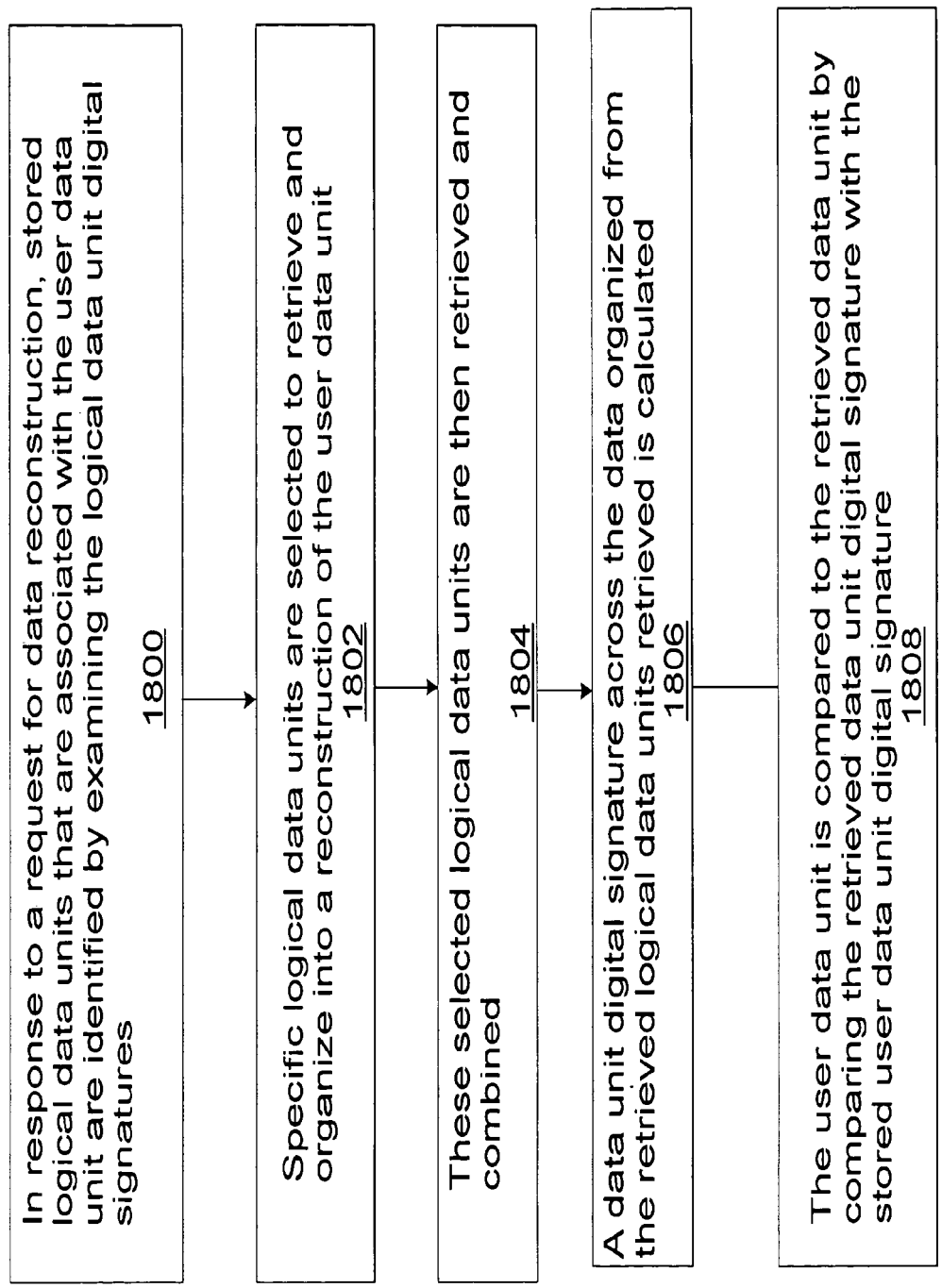
FIG. 3A is a flowchart of a first variation of a method of reconstructing digital data.
Figure 3B:
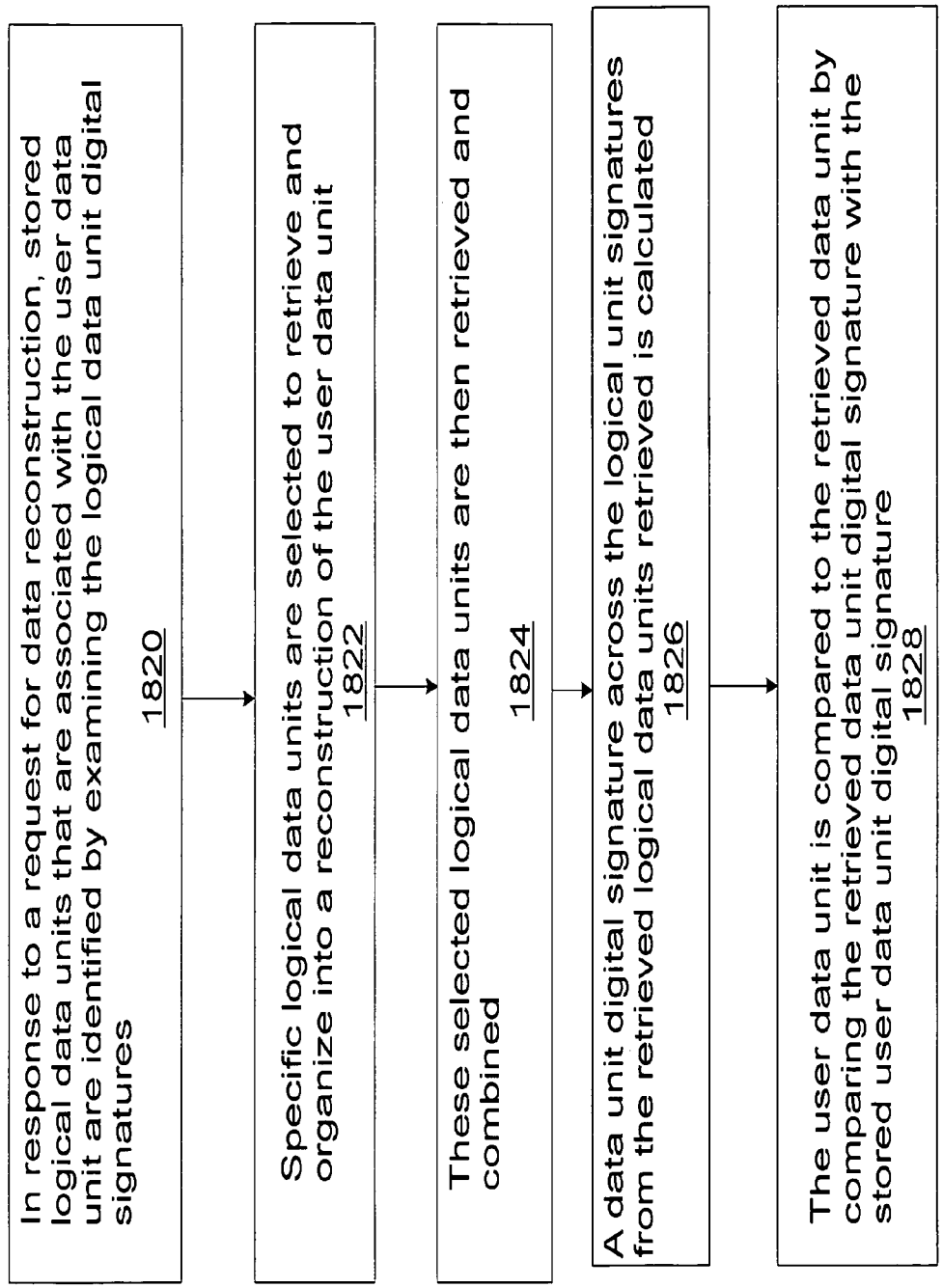
FIG. 3B is a flowchart of a second variation of a method of reconstructing digital data.

In another embodiment of the present invention, a method of reconstructing digital data utilizing data stored by the method set forth above is provided. Once the user data unit is stored, the data may be reconstructed when desired. With reference to FIGS. 3A and 3B, flowcharts illustrating this data reconstruction are provided. FIG. 3A provides a flowchart of first variation of the present embodiment. In response to a request for data reconstruction, stored logical data units that are associated with the user data unit (either directly or via a synonym relationship) are identified by examining the logical data unit digital signatures (Box 1800). Next, specific logical data units are selected to be retrieved and organized into a reconstruction of the user data unit (Box 1802). This selection process could be driven by a policy engine or a quality of service specification wherein the using system has communicated with the storage system earlier a set of rules for retrieval of the user data unit. These rules could include a number of performance or reliability requirements that would guide selection of specific logical data units to be used in preference to others for retrieval (such as those locally stored versus remote locations, or those on high performance disk rather than second tier disk). These selected logical data units are then retrieved as indicated by Box 1804. Such retrieval can be in any order or in parallel. A data unit digital signature across the data organized from the retrieved logical data units is calculated (Box 1806). This calculated digital signature is referred to as a retrieved logical data unit digital signature. Finally, the user data unit is compared to the retrieved data unit by comparing the retrieved data unit digital signature with the stored user data unit digital signature (Box 1808). FIG. 3B provides a flowchart of a second variation of the present embodiment. In response to a request for data reconstruction, stored logical data units that are associated with the user data unit (either directly or via a synonym relationship) are identified by examining the logical data unit digital signatures (Box 1820). Next, specific logical data units are selected to be retrieved and organized into a reconstruction of the user data unit (Box 1822). This selection process could be driven by a policy engine or a quality of service specification wherein the using system has communicated with the storage system earlier a set of rules for retrieval of the user data unit. These rules could include a number of performance or reliability requirements that would guide selection of specific logical data units to be used in preference to others for retrieval (such as those locally stored versus remote locations, or those on high performance disk rather than second tier disk). These selected logical data units are then retrieved as indicated by Box 1824. Again, such retrieval can be in any order or in parallel. A data unit digital signature across the logical unit digital signatures from the retrieved logical data units is calculated (Box 1826). Again, this calculated digital signature is referred to as a retrieved logical data unit digital signature. Finally, the user data unit is compared to the retrieved data unit by comparing the retrieved data unit digital signature with the stored user data unit digital signature (Box 1828).

Figure 4:
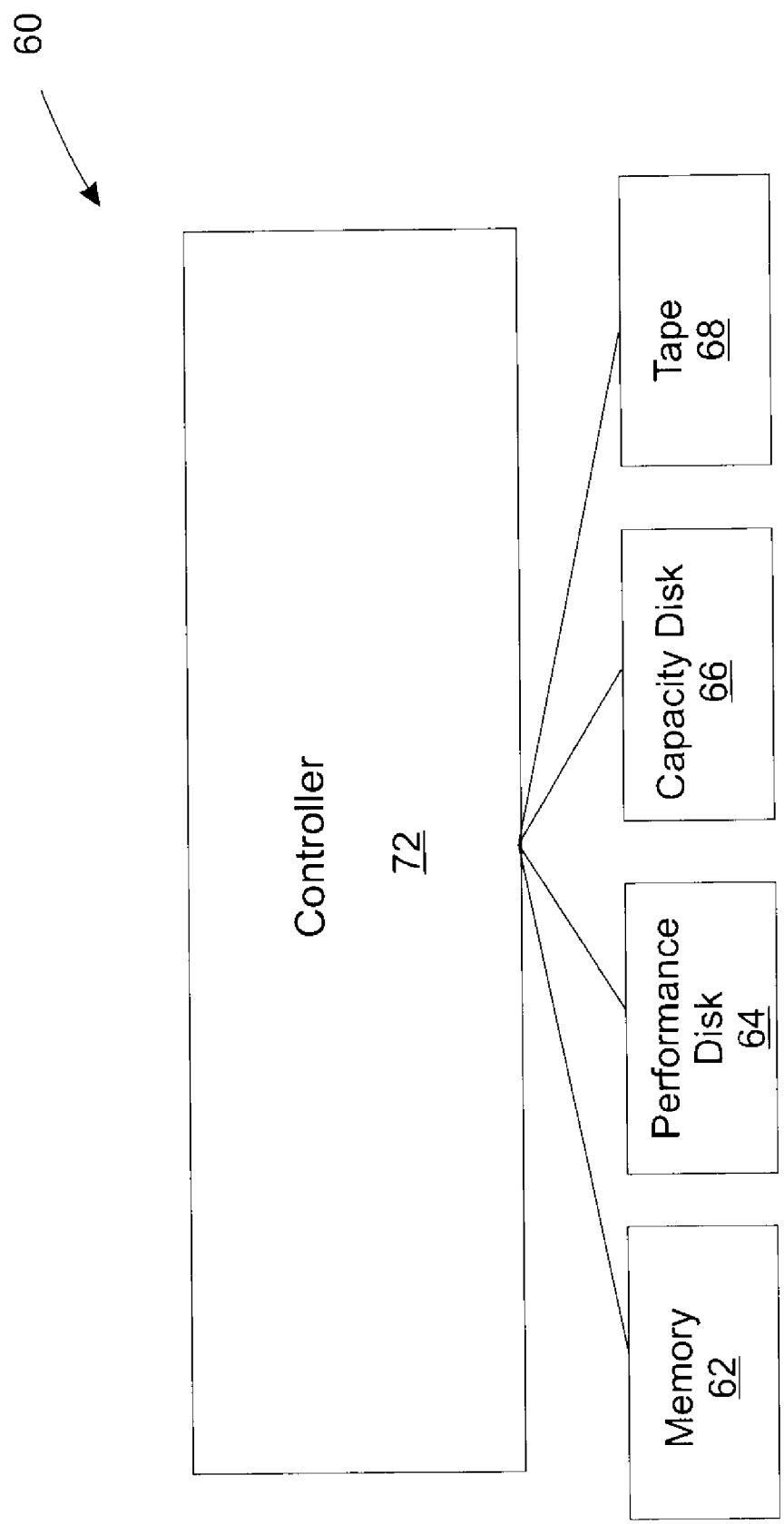
FIG. 4 is a schematic illustration of the system for reconstructing data.

In another embodiment of the present invention, a system for reconstructing data stored in a data storage system is provided. The system of the present invention executes the methods of the invention set forth above. With reference to FIG. 4, a schematic illustration of the system for reconstructing data is provided. System 60 includes controller 72 and one or more storage devices 74, 78. Controller 72 includes one or more computer systems that execute one or more of the steps of the methods set forth above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of managing data stored in a data storage system, the method comprising:
    a) receiving a user data unit to be stored in the data storage system, the user data unit comprising data delineated by data boundaries and the user data unit being provided by a using system for storage in the data storage system;
    b) identifying a plurality of logical data units which are subsets of the user data unit while the user data unit is streaming to the data storage system;
    c) associating a plurality of logical data unit hashes with the logical data units identified in step b) wherein each logical data unit has an associated logical data unit hash;
    d) storing the plurality of logical data unit hashes as stored logical data unit hashes;
    e) utilizing the logical data unit hashes to determine whether to actually store each logical data unit thereof, and
    f) associating one or more hashes with the user data unit.

2. The method of claim 1 wherein one of the one or more hashes associated with the user data unit of step f) is created by running an entire set of received data in a prescribed order through a hash creator.

3. The method of claim 1 wherein at least one of the hashes associated with the user data unit of step f) is created by a combination of logical data unit hashes of step c.

4. The method of claim 1 wherein the logical data unit comprises a data unit selected from the group consisting of a record, a data block, a database row, a database column, a data object, a device sector, a device track, and combinations thereof.

5. The method of claim 1 wherein each of the logical data units are greater than a predetermined size.

6. The method of claim 1 further comprising retrieving the data unit in a piecewise method upon a request for the data unit by:
    g) identifying stored logical data units that are associated with the user data unit by examining the logical data unit hashes;
    h) selecting specific logical data units to retrieve and organize into a reconstruction of the user data unit;
    i) retrieving the selected logical data units;
    j) calculating a retrieved data unit hash across the data organized from the logical data units retrieved in step i); and
    k) validating the user data unit by comparing the retrieved data unit hash with the user data unit hash.

7. The method of claim 6 wherein the selected logical data units are retrieved in any order or in parallel.

8. The method of claim 6 wherein step j) comprises running a hash across all the logical data units in order or by combination of the logical data unit hashes.

9. The method of claim 6 wherein step h) is performed in accordance to a set of predetermined rules that provide preference for retrieving logical data units.

10. The method of claim 6 wherein the request for a logical data unit occurs when a determination is made that data is lost or damaged.

11. A method of reconstructing data stored in a data storage system, the method comprising:
    a) receiving a user data unit to be stored in the data storage system, the user data unit comprising data delineated by data boundaries and the user data unit being provided by a using system for storage in the data storage system;
    b) identifying a plurality of logical data units which are subsets of the user data unit while the user data unit is streaming to the data storage system;

c) associating a plurality of logical data unit hashes with the logical data units identified in step b) wherein each logical data unit has an associated logical data unit hash;

d) storing the plurality of logical data unit hashes as stored logical data unit hashes;

e) utilizing the logical data unit hashes to determine whether to actually store each logical data unit thereof; and f) associating one or more data unit hashes with the user data unit;

g) identifying stored logical data units that are associated with the user data unit by examining the logical data unit hashes;

h) selecting specific logical data units to retrieve and organize into a reconstruction of the user data unit;

i) retrieving the selected logical data units;

j) calculating a retrieved data unit hash across the data organized from the logical data units retrieved in step i); and k) validating the user data unit by comparing the retrieved data unit hash with the user data unit hash.

12. The method of claim 11 wherein one of the one or more hashes associated with the user data unit of step f) is created by running an entire set of received data in a prescribed order through a hash creator.

13. The method of claim 11 wherein at least one of the hashes associated with the user data unit of step f) is created by a combination of logical data unit hashes of step c.

14. The method of claim 11 wherein the logical data unit comprises a data unit selected from the group consisting of a record, a data block, a database row, a database column, a data object, a device sector, a device track, and combinations thereof.

15. The method of claim 11 wherein each of the logical data units are greater than a predetermined size.

16. A digital data storage system comprising:
one or more data storage devices for physically storing digital data received from a using process; and
a controller operable to:
a) receive a user data unit to be stored in the data storage system, the user data unit comprising data delineated by data boundaries and the user data unit being provided by a using system for storage in the data storage system;
b) identify a plurality of logical data units which are subsets of the user data unit while the user data unit is streaming to the data storage system;
c) associate a plurality of logical data unit hashes with the logical data units identified in step b) wherein each logical data unit has an associated logical data unit hash;
d) store the plurality of logical data unit hashes as stored logical data unit hashes;
e) utilize the logical data unit hashes to determine whether to actually store each logical data unit thereof; and
f) associate one or more hashes with the user data unit.

17. The digital data storage system of claim 16 wherein the controller is further operable to:
g) identifying stored logical data units that are associated with the user data unit by examining the logical data unit hashes;
h) selecting specific logical data units to retrieve and organize into a reconstruction of the user data unit;
i) retrieving the selected logical data units;
j) calculating a retrieved data unit hash across the data organized from the logical data units retrieved in step i); and
k) validating the user data unit by comparing the retrieved data unit hash with the user data unit hash.

18. The storage system of claim 16 wherein the plurality of logical data unit data hashes are stored on the one or more storage devices.

* * * * *